(12) United States Patent
Zhong

(10) Patent No.: US 11,429,249 B2
(45) Date of Patent: Aug. 30, 2022

(54) APPLICATION PROGRAM DATA PROCESSING METHOD AND DEVICE

(71) Applicant: Advanced New Technologies Co., Ltd., George Town (KY)

(72) Inventor: Shuna Zhong, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 6 days.

(21) Appl. No.: 16/183,415

(22) Filed: Nov. 7, 2018

(65) Prior Publication Data

US 2019/0073097 A1 Mar. 7, 2019

Related U.S. Application Data

(63) Continuation of application No. PCT/CN2017/079993, filed on Apr. 11, 2017.

(30) Foreign Application Priority Data

May 12, 2016 (CN) .......................... 201610312555.9

(51) Int. Cl.
*G06F 3/0482* (2013.01)
*G06F 3/0488* (2022.01)
(Continued)

(52) U.S. Cl.
CPC .......... *G06F 3/0482* (2013.01); *G06F 3/0488* (2013.01); *G06F 3/04817* (2013.01);
(Continued)

(58) Field of Classification Search
CPC .. G06F 3/04817; G06F 3/0482; G06F 3/0488; G06F 3/04883; G06F 9/485; G06T 13/80
See application file for complete search history.

(56) References Cited

U.S. PATENT DOCUMENTS 6,104,397 A 8/2000 Ryan et al.
6,337,698 B1 * 1/2002 Keely, Jr .............. G06F 3/0483
(Continued)

FOREIGN PATENT DOCUMENTS

CN 102081502 6/2011
CN 102866908 1/2013
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Jennifer N Welch
*Assistant Examiner* — Amy P Hoang
(74) *Attorney, Agent, or Firm* — Fish & Richardson P.C.

(57) ABSTRACT

Technologies related to application program data processing are disclosed. In one implementation, a first operation is detected on a mobile computing device. A manipulation mode of one or more mobile applications (APPs) is initiated in response to the first operation. A second operation is detected for selecting at least one of the one or more APPs performed on the mobile computing device. A manipulation of the at least one of the one or more APPs is initiated in response to the second operation if a predetermined condition associated with the second operation is met. An animation is performed on one or more APP icons corresponding to the at least one of the one or more APPs to show a status of the manipulation of the at least one of the one or more APPs.

20 Claims, 10 Drawing Sheets

---

Trigger a pending state of an application program when detecting a first predetermined user operation in an interface, where the interface has an icon of at least one application program — S10

In the pending state, process data of a target application program when detecting a second predetermined user operation on the target application program — S12

(51) Int. Cl.
    *G06F 9/48*      (2006.01)
    *G06F 3/04817*   (2022.01)
    *G06F 3/04883*   (2022.01)
    *G06T 13/80*     (2011.01)

(52) U.S. Cl.
    CPC .......... *G06F 3/04883* (2013.01); *G06F 9/485* (2013.01); *G06T 13/80* (2013.01)

(56) References Cited

U.S. PATENT DOCUMENTS

| | | | |
|---|---|---|---|
| 8,015,507 B2* | 9/2011 | Madsen | G10H 1/0025 715/824 |
| 8,749,560 B2* | 6/2014 | Ording | G06T 13/80 345/475 |
| 9,360,991 B2* | 6/2016 | Celebisoy | G06F 3/04815 |
| 2011/0221948 A1 | 9/2011 | Saito | |
| 2011/0252346 A1 | 10/2011 | Chaudhri | |
| 2011/0302414 A1* | 12/2011 | Logan | H04L 51/02 713/168 |
| 2013/0159892 A1 | 6/2013 | Suraj et al. | |
| 2013/0178195 A1* | 7/2013 | Luna | H04W 24/04 455/414.1 |
| 2014/0101621 A1* | 4/2014 | Zhu | G06F 3/017 715/863 |
| 2015/0089659 A1* | 3/2015 | Beckman | H04L 63/02 726/26 |
| 2015/0153931 A1* | 6/2015 | Zhang | G06F 16/957 715/768 |
| 2016/0162270 A1* | 6/2016 | Kumar | G06F 3/0488 717/177 |
| 2019/0073097 A1* | 3/2019 | Zhong | G06F 3/0346 |

FOREIGN PATENT DOCUMENTS

| | | |
|---|---|---|
| CN | 103106018 | 5/2013 |
| CN | 104077145 | 10/2014 |
| CN | 104317740 | 1/2015 |
| CN | 105095107 | 11/2015 |
| CN | 105138242 | 12/2015 |
| CN | 105320544 | 2/2016 |
| CN | 106126026 | 11/2016 |
| CN | 106201170 | 12/2016 |
| JP | 2011193249 | 9/2011 |
| JP | 2014093029 | 5/2014 |
| KR | 20110037654 | 4/2011 |
| KR | 20150025754 | 3/2015 |

OTHER PUBLICATIONS

Nakamoto, "Bitcoin: A Peer-to-Peer Electronic Cash System," www.bitcoin.org, 2005, 9 pages.

European Extended Search Report in European Patent Application No. 17795366.8, dated May 8, 2019, 13 pages.

International Search Report by the International Searching Authority issued in International Application No. PCT/CN2017/079993 dated Jul. 18, 2017; 11 pages.

[No Author Listed], "Nokia 7710," Nokia Corporation, 2005, 153 pages.

PCT International Preliminary Report on Patentability in International Application No. PCT/CN2017/079993, dated Nov. 13, 2018, 13 pages (with English translation).

PCT Written Opinion of the International Search Authority in International Application No. PCT/CN2017/079993, dated Jul. 18, 2017, 12 pages (with English translation).

Supplementary European Search Report in European Application No. 17795366.8, dated Sep. 20, 2019, 14 pages.

Cousins, thenextweb.com [online], "How to implement gestures into your mobile design," Nov. 10, 2015, retrieved on Mar. 25, 2021, retrieved from URL<https://thenextweb.com/dd/2015/11/09/how-to-implement-gestures-into-your-mobile-design/>, 15 pages.

Inforati.jp [online], "How to Maintain Max OS X regularly," Sep. 10, 2010, retrieved on Apr. 1, 2021, retrieved from URL<http://inforati.jp/apple/mac-tips-techniques/system-hints/how-to-maintain-mac.html>, 39 pages (with machine translation).

osxdaily.com [online], "How to Uninstall Apps from iPhone & iPad in Seconds," Aug. 30, 2014, retrieved on Nov. 5, 2021, retrieved from URL<https://osxdaily.com/2014/08/30/how-to-uninstall-apps-iphone-ipad-quick/>, 14 pages.

* cited by examiner

APPLICATION PROGRAM DATA PROCESSING METHOD AND DEVICE

CROSS-REFERENCE TO RELATED APPLICATIONS

This application is a continuation of PCT Application No. PCT/CN2017/079993, filed on Apr. 11, 2017, which claims priority to Chinese Patent Application No. 201610312555.9, filed on May 12, 2016, and each application is hereby incorporated by reference in its entirety.

TECHNICAL FIELD

The present application relates to the data processing field and, in particular, to an application program data processing method and device.

BACKGROUND

With the popularization of mobile terminal devices, such as smartphones and tablet computers, people are gradually getting used to utilizing an application program (APP) to surf the Internet. However, many caches are accumulated after an APP is used for a long time. If the caches are not cleared in time, not only is the system storage occupied, but the speed of loading the APP is affected.

Currently, a method for clearing an APP cache is mainly as follows: an APP is started, a corresponding function button for clearing the cache is identified, and tapping the function button can trigger an event of clearing the cache by client software. However, the running speed of the APP is relatively slow when a relatively large amount of caches are accumulated in the APP. Consequently, a relatively long startup time is needed. In addition, after a user taps into the APP, identifying the corresponding function button for clearing the cache involves search costs, which is time consuming and laborious, and user experience is poor.

SUMMARY

An objective of implementations of the present application is to provide an application program data processing method and device, to quickly and efficiently clear data of an application program without starting the application program, thereby improving user experience.

The present application provides an application program data processing method, where the method includes the following: triggering a pending state of an application program when detecting a first predetermined user operation in an interface, where the interface has an icon of at least one application program; and in the pending state, processing data of a target application program when detecting a second predetermined user operation on the target application program.

The present application provides an application program data processing device, where the device includes the following: a pending state triggering module, configured to trigger a pending state of an application program when a first predetermined user operation in an interface is detected, where the interface has an icon of at least one application program; and a data processing module, configured to process data of a target application program in the pending state, when a second predetermined user operation on the target application program is detected.

It can be seen from the technical solutions provided in the implementations described above that, the first predetermined user operation in the interface is detected, and the pending state of the application program is triggered based on the first predetermined operation. Then, in the pending state, an event of processing the data of the target application program can be triggered when the second predetermined user operation on the target application program is detected, so as to complete data processing of the target application program. In an entire process of clearing the data of the application program, the data can be cleared without starting the application program. The data can be quickly and efficiently cleared, and user learning curve can be less steep, so that user experience can be improved.

BRIEF DESCRIPTION OF DRAWINGS

To describe the technical solutions in the implementations of the present application or in the existing technology more clearly, the following briefly describes the accompanying drawings required for describing the implementations or the existing technology. Apparently, the accompanying drawings in the following description merely show some implementations of the present application, and a person of ordinary skill in the art can still derive other drawings from these accompanying drawings without creative efforts.

DESCRIPTION OF IMPLEMENTATIONS

To make a person skilled in the art understand the technical solutions in the present application better, the following clearly and completely describes the technical solutions in the implementations of the present application with reference to the accompanying drawings in the implementations of the present application. Apparently, the described implementations are merely some but not all of the implementations of the present application. Other implementations obtained by a person of ordinary skill in the art based on the implementations of the present application without creative efforts shall fall within the protection scope of the present application.

Figure 1:
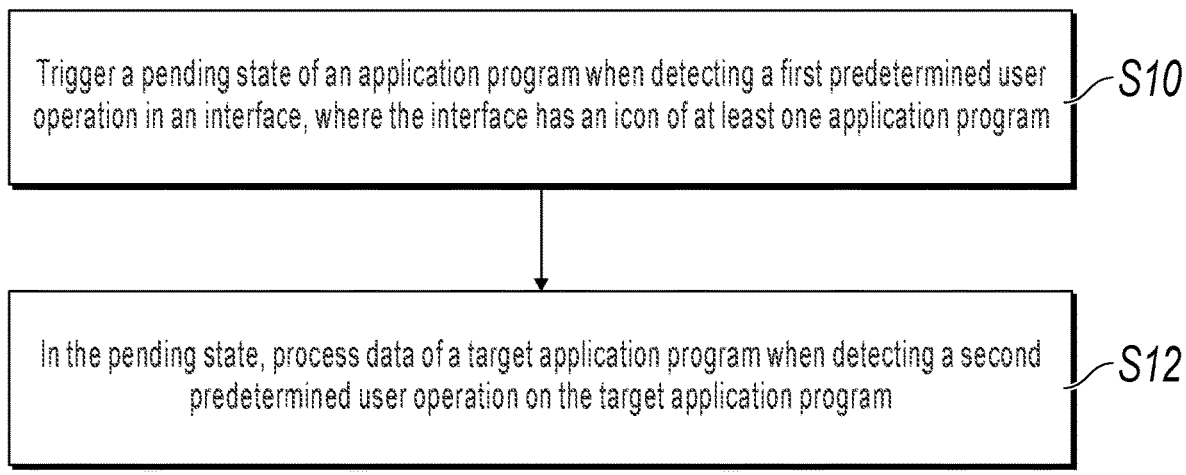
FIG. 1 is a flowchart illustrating an application program data processing method, according to an implementation of the present application.

The following describes in detail an application program data processing method and device in the present application with reference to the accompanying drawings. FIG. 1 is a flowchart illustrating an application program data processing method, according to an implementation of the present application. Although the present application provides operation steps of a method or a structure of a device shown in the following implementations or the accompanying drawings, the method or the device can include more or fewer operation steps or module structures based on conventional or noncreative efforts. For steps or structures that have no necessary logical causal relationship, an execution sequence of the steps or a module structure of the device is not limited to an execution sequence or a module structure provided in the implementations of the present application. When the method or the module structure is executed by a device or a terminal product in actual applications, the method or the module structure can be executed based on the sequence of the method or the module structure shown in the implementations or accompanying drawings, or can be executed in parallel (for example, a parallel processor or a multi-thread processing environment).

Referring to FIG. 1, an application program data processing method according to an implementation of the present application can include the following steps.

Step S10: Trigger a pending state of an application program when detecting a first predetermined user operation in an interface, where the interface has an icon of at least one application program.

In the present implementation, the application program data processing method can be applied to a device that has a touchscreen. In addition, another device that completes application control based on interaction with the touchscreen is not excluded. The device described in the present application can include a personal computer (PC), a server computer, a mobile communications terminal, a handheld device, a personal digital assistant (PDA), a tablet computer, a wearable device, an enterprise or public self-service terminal, etc. The device can obtain information about interaction with a subject of a predetermined operation, by using a certain method. The interaction information can include a time, a location, etc. of touching the touchscreen by a subject of the first predetermined operation. When interacting with the user, the device performs data matching by collecting a set of information, such as a time and a location of the user's touch point.

In the present implementation, an interface is correspondingly disposed on the touchscreen. The interface can be a system interface that has an icon of at least one application program. The application program can be a computer program used to complete one or more tasks. It can run in a user mode, interact with the user, and has a visual user interface. The application program can include the following: a local service category, such as DIANPING and DING DING COUPON; an online shopping category, such as TAOBAO, JINGDONG, and DANGDANG; a social instant communication tool category, such as WECHAT and DINGTALK; a financial management category, such as ANT FORTUNE and ALIPAY; and other categories such as an audio or video playback category, a navigation category, and a game category. Certainly, the application program is not limited to the previous classification and enumeration, and is not limited in the present application.

In the present implementation, the subject that implements the first predetermined operation can be a hand. In most application scenarios, the user usually uses a finger to tap, press, slide, and shake in a predetermined area on the touchscreen. Certainly, in another implementation, it can be easily figured out that, a corresponding touch control assistant device is used to perform an operation in the predetermined area on the touchscreen. For example, a commonly-used device can include a capacitive stylus, an electromagnetic induction stylus, an infrared-based short-range remote control device, etc. Therefore, the subject that triggers the touchscreen in the present application can include at least one of a hand, a resistive sensing device, a capacitive sensing device, an infrared sensing device, an electromagnetic induction device, an optical sensing device, and a heat sensing device.

In the present implementation, an electrical signal can be correspondingly generated by the touchscreen based on the first predetermined operation. The electrical signal can be an electrical signal generated by the touchscreen for the subject when the previous enumerated subject is in contact with the touchscreen or is within a sensing distance. In addition, the electrical signal that corresponds to the first predetermined user operation can be a superposition of an electrical signal detected by the touchscreen and an electrical signal received by a predetermined function key, or an electrical signal received by a predetermined function key. The application program can be triggered to enter the pending state based on the first predetermined operation.

In the present implementation, the pending state of the application program can indicate that the application program enters the pending state. In this case, the user can specify a corresponding application program based on an actual need, to perform corresponding processing on the specified application program subsequently. The processing can be processing data of the application program.

Step S12: In the pending state, process data of a target application program when detecting a second predetermined user operation on the target application program.

In the present implementation, in the pending state, the data of the corresponding application program can be processed based on the user's selection. The application program that needs to be cleaned is referred to as a target application program in the following. There may be one or more target application programs, and the number is not limited in the present application. Generally, the running speed of the application program is relatively slow when a relatively large amount of caches are accumulated in the application program. In this case, the user may need to process the data of the application program.

In an implementation, processing data of a target application program can include at least one of the following: deleting a cache in the target application program, compressing the data in the target application program, and organizing fragments in the target application program. Certainly, the data of the target application program can alternatively be processed by using another method, which is not limited in the present application.

The cache can be data that is temporarily stored, and usually can be stored in a local disk. The cache can be classified into at least two categories, and the cache includes the following: a first category can be a temporary cache file that is downloaded when the file is opened for viewing, and a second category can be a favorite cache file that the user performs a favorite operation.

In the present implementation, a subject that implements the second predetermined operation can be a hand. In most application scenarios, the user usually uses a finger to tap, press, slide, and shake in a predetermined area on the touchscreen. Certainly, in another implementation, it can be easily figured out that, a corresponding touch control assistant device is used to perform an operation in the predetermined area on the touchscreen. For example, a commonly-used device can include a capacitive stylus, an electromagnetic induction stylus, an infrared-based short-range remote control device, etc. Therefore, the subject that triggers the touchscreen in the present application can include at least one of a hand, a resistive sensing device, a capacitive sensing device, an infrared sensing device, an electromagnetic induction device, an optical sensing device, and a heat sensing device.

In the present implementation, an electrical signal can be correspondingly generated on the touchscreen based on the second predetermined operation. The electrical signal can be an electrical signal generated by the touchscreen for the subject when the previous enumerated subject is in contact with the touchscreen or is within a sensing distance. In addition, the electrical signal that corresponds to the second predetermined user operation can be superposition of an electrical signal detected by the touchscreen and an electrical signal received by a predetermined function key, or an electrical signal received by a predetermined function key. An event of clearing the data of the target application program can be triggered based on the second predetermined operation.

In the present implementation, in the pending state, the data of the target application program can be processed based on a predetermined rule when the second predetermined user operation on the target application program is detected. The predetermined rule is used to at least maintain a basic function of the target application program. The predetermined rule can be used to ensure that, when the second predetermined operation is received at a coordinate point that corresponds to the target application program, the data of the target application program can be processed, and the target application program itself is not completely or partly deleted.

The predetermined rule may be as follows: In the pending state, when a sub-icon that can be used to completely or partly delete the target application program appears on an icon that corresponds to the target application program, a location for triggering the target application program to enter a data processing event is set to an icon location of the target program except the sub-icon. In addition, the predetermined rule may be as follows: An original function of the sub-icon is intercepted. When a location of receiving the second predetermined operation is a location where the sub-icon is located, an event of processing the data of the target application program can also be triggered, and the target application program itself is not completely or partly deleted.

In the present implementation of the present application, the first predetermined user operation in the interface is detected, and the pending state of the application program is triggered based on the first predetermined operation. Then, in the pending state, the event of processing the data of the target application program can be triggered when the second predetermined user operation on the target application program is detected, so as to complete data processing of the target application program. In an entire process of clearing the data of the application program, the data can be cleared without starting the application program. The data can be quickly and efficiently cleared, and user learning curve can be less steep, so that user experience can be improved.

Figure 2:
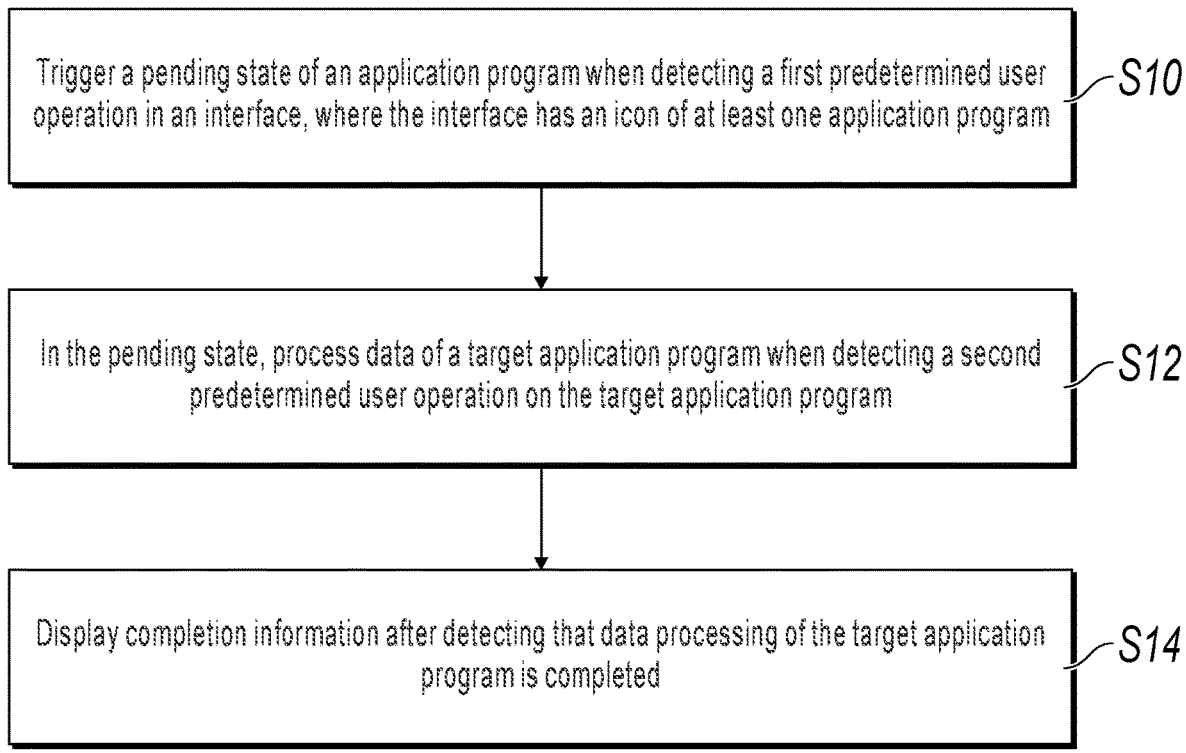
FIG. 2 is a flowchart illustrating an application program data processing method, according to an implementation of the present application.

Referring to FIG. 2, in an implementation, the method can further include the following step:

Step S14: Display completion information after detecting that data processing of the target application program is completed.

In the present implementation, completion of data processing of the target application program may be that, the cache in the target application program is deleted, or the data in the target application program is compressed, or the fragments in the target application program are organized, or may be one or more of the previous cases. Implementations are not limited in the present application. After data processing of the target application program is completed, for example, after it is detected that the cache in the target application program is deleted, or that the data in the target application program is compressed to a predetermined storage capacity, or that the fragments in the target application program are consecutively stored in consecutive disk clusters, or when any combination of the previous cases is detected, the completion information that indicates the completion of data processing of the target application program can be sent to notify the user that data processing of the target application program is completed.

In an implementation, the completion information can include any one of the following: information for controlling an icon of the target application program to move based on a predetermined track, and information for controlling an icon of the target application program to switch from a first display state to a second display state.

In the present implementation, after data processing of the target application program is completed, the completion information can be sent to notify the user that data processing of the target application program is completed in this case.

The completion information can be the information for controlling the icon of the target application program to move based on the predetermined track. For example, when data processing of the target application program is completed, the icon of the target application program can be flipped 360 degrees, or rotated 180 degrees back and forth; or can move based on another track. Implementations are not limited in the present application.

In addition, when data processing of the target application program is completed, the completion information can be the information for controlling the icon of the target application program to switch from the first display state to the second display state. For example, the icon of the target application program can be displayed in the first display state when the target application program is in a data clearing process. The first display state can be fuzzy processing, shadow coverage, etc. Certainly, a form of the first display state is not limited to the previous example, and is not limited in the present application. The second display state can be an original icon of the target application program, or a new icon formed by setting a sub-identifier on the basis of the original icon, to indicate that the application program just completes clearing of data in the target application program. Or the second display state can be of another form, which is not limited in the present application.

Figure 3:
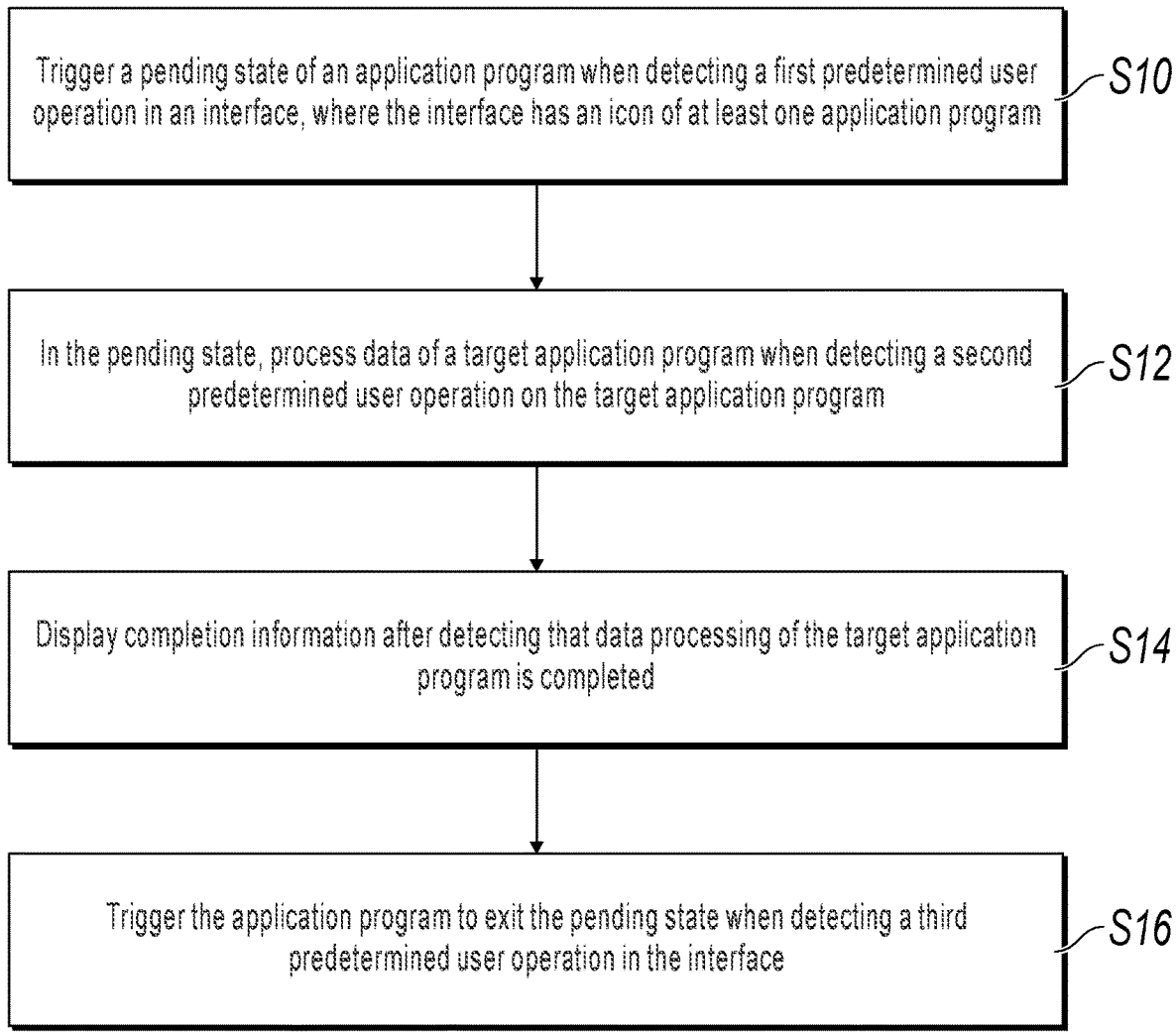
FIG. 3 is a flowchart illustrating an application program data processing method, according to an implementation of the present application.

Referring to FIG. 3, in an implementation, the method can further include the following step:

Step S16: Trigger the application program to exit the pending state when detecting a third predetermined user operation in the interface.

In the present implementation, after the user clears data of all application programs that need to be cleared, the corresponding third predetermined operation can be performed at a predetermined location in the interface, so as to exit the pending state.

In the present implementation, a subject that implements the third predetermined operation can be a hand. In most application scenarios, the user usually uses a finger to tap, press, slide, and shake in a predetermined area on the touchscreen. Certainly, in another implementation, it can be easily figured out that, a corresponding touch control assistant device is used to perform an operation in the predetermined area on the touchscreen. For example, a commonly-used device can include a capacitive stylus, an electromagnetic induction stylus, an infrared-based short-range remote control device, etc. Therefore, the subject that triggers the touchscreen in the present application can include at least one of a hand, a resistive sensing device, a capacitive sensing device, an infrared sensing device, an electromagnetic induction device, an optical sensing device, and a heat-sensing device.

In the present implementation, an electrical signal can be correspondingly generated on the touchscreen based on the third predetermined operation. The electrical signal can be an electrical signal generated by the touchscreen for the subject when the previous enumerated subject is in contact with the touchscreen or is within a sensing distance. In addition, the electrical signal that corresponds to the third predetermined operation can be an electrical signal received by a predetermined function key. Alternatively, the electrical signal that corresponds to the third predetermined user operation can be an electrical signal generated after the user taps a blank location in the interface or presses a predetermined function key, etc. An event that the application program exits the pending state can be triggered based on the third predetermined operation.

In an implementation, after the step of detecting that data processing of the target application program is completed, the method can further include the following: triggering the application program to exit the pending state.

In the present implementation, the application program can directly exit the pending state after step S14 of detecting that data processing of the target application program is completed.

When there is one target application program that needs to be cleaned, after data processing of the target application program is completed, the application program can exit the pending state to restore to an original state of the interface. When there are a plurality of target application programs that need to be cleaned, after data processing of the last target application program is completed, the application program can exit the pending state to restore to an original state of the interface.

In an implementation, after the step of detecting a second predetermined user operation on the target application program, the method can further include the following: invoking at least two pre-stored deletion options based on the second predetermined operation, where each deletion option corresponds to a cache category in the target application program; and correspondingly performing the step of processing data of the target application program based on a selection result of the user for the deletion options.

In the present implementation, the cache can be data that is temporarily stored, and usually can be stored in a local disk. The cache can be classified into at least two categories, and the cache includes the following: a first category can be a temporary cache file that is downloaded when the file is opened for viewing, and a second category can be a favorite cache file that the user uses to perform a favorite operation.

The deletion options can correspond to the categories of the cache. A first deletion option and a second deletion option can be set for the cache. The first deletion option corresponds to the cache of the first category, and the second deletion option corresponds to the cache of the second category.

The deletion options can be invoked for the user when the second predetermined user operation is received. When selecting one or more of the deletion options, the user can delete the cache in the corresponding cache category based on the selection result of the user for the deletion options. After the second predetermined operation is received, the deletion options can be presented to the user in a form of a dialog box in the interface. Different deletion options can correspond to different deletion buttons.

In the present implementation, processing the data of the target application program can be deleting the cache in the cache category that corresponds to the target application program. When the user needs to delete a temporary cache file of the first category, the user can choose to tap a corresponding deletion button, so as to delete the cache in the cache category that corresponds to the target application program.

In the present implementation, different deletion options are set for different cache categories, so that the user can selectively delete a cache file that the user does not expect to store, and selectively store information that the user considers valuable, to further improve user experience.

In an implementation, the first predetermined operation can include any one or a combination of the following: a firm press operation, a touch and hold operation, a multi-tap operation, and a shake operation.

In the present implementation, a plurality of coordinate points can be set on the touchscreen. When the first predetermined operation is detected at a coordinate point that is of an icon of the application program and that is correspondingly set in the interface of the touchscreen, a corresponding trigger signal can be generated to trigger the application program to enter the pending state.

In the present implementation, a trigger signal generated based on the firm press operation can be a detected electrical signal of at least one coordinate point in the interface of the touchscreen, which is greater than predetermined pressure. A trigger signal generated based on the touch and hold operation can be an electrical signal that is greater than predetermined duration and that is detected from at least one coordinate point in the interface of the touchscreen, or an electrical signal that is greater than predetermined duration and that is detected at a predetermined function key or function key combination. An input signal generated based on the multi-tap operation can be a plurality of discontinuous electrical signals detected from at least one coordinate point in the interface of the touchscreen. A time interval between the two adjacent generated electrical signals satisfies predetermined duration. For example, the predetermined duration can be between 1 second and 5 seconds. An input signal generated based on the shake operation can be an input signal generated when an acceleration received by an acceleration sensor reaches a predetermined threshold. A trigger signal generated based on the shake operation can be an acceleration signal generated when the acceleration sensor reaches a specified threshold. The acceleration sensor is integrated into a mobile device, and the acceleration sensor can measure accelerations in three directions: X, Y, and Z. The X, Y, and Z directions are perpendicular to each other, and can form a three-dimensional space coordinate system. A value of the X direction can represent a horizontal movement of the device, a value of the Y direction can represent a vertical movement of the device, and a value of the Z direction can represent a vertical direction of the device in space. When used, the accelerations in the three directions are transmitted to an operating system, and the operating system combines the accelerations in the three directions into a final acceleration value.

In an example, an electrical signal that corresponds to the first predetermined operation can be an electrical signal generated by touching and holding the icon of the application program in the interface by the user. In addition, the electrical signal that corresponds to the first predetermined operation can be an electrical signal generated by pressing, by the user, a function key disposed on the device or a combination of a plurality of function keys. For example, the first predetermined operation can be pressing a combination of a home key and a volume key to generate an electrical signal. An implementation of the first predetermined operation is not limited to the previous description, and is not listed one by one in the present application. It can be understood that, in the enlightenment of the technical essence of the present application, a person skilled in the art can further make another change on the first predetermined operation, provided that a function implemented and an effect achieved by the first predetermined operation are the same as or similar to those of the present application, and shall be covered within the protection scope of the claims of the present application.

In an implementation, the second predetermined operation can include any one or a combination of the following: a firm press operation, a touch and hold operation, a multi-tap operation, and a shake operation.

In the present implementation, a plurality of coordinate points can be set on the touchscreen. When the second predetermined operation is detected at a coordinate point that is of an icon of the application program and that is correspondingly set in the interface of the touchscreen, a corresponding trigger signal can be generated to trigger the application program to enter the pending state.

In the present implementation, a trigger signal generated based on the firm press operation can be an electrical signal that is greater than predetermined pressure and that is detected from at least one coordinate point in the interface of the touchscreen. A trigger signal generated based on the touch and hold operation can be an electrical signal that is greater than predetermined duration and that is detected from at least one coordinate point in the interface of the touchscreen, or an electrical signal that is greater than predetermined duration and that is detected at a predetermined function key or function key combination. An input signal generated based on the multi-tap operation can be a plurality of discontinuous electrical signals detected from at least one coordinate point in the interface of the touchscreen. A time interval between the two adjacent generated electrical signals satisfies predetermined duration. For example, the predetermined duration can be between 1 second and 5 seconds. An input signal generated based on the shake operation can be an input signal generated when an acceleration received by an acceleration sensor reaches a predetermined threshold. A trigger signal generated based on the shake operation can be an acceleration signal generated when the acceleration sensor reaches a specified threshold. The acceleration sensor is integrated into a mobile device, and the acceleration sensor can measure accelerations in three directions: X, Y, and Z. The X, Y, and Z directions are perpendicular to each other, and can form a three-dimensional space coordinate system. A value of the X direction can represent a horizontal movement of the device, a value of the Y direction can represent a vertical movement of the device, and a value of the Z direction can represent a vertical direction of the device in space. When used, the accelerations in the three directions are transmitted to an operating system, and the operating system combines the accelerations in the three directions into a final acceleration value.

In an example, an electrical signal that corresponds to the second predetermined operation can be an electrical signal generated by pressing the icon of the application program in the interface and by shaking the device by the user. In addition, the electrical signal that corresponds to the second predetermined operation can be an electrical signal generated by pressing, by the user, a function key disposed on the device or a combination of a plurality of function keys. An implementation of the second predetermined operation is not limited to the previous description, and is not listed one by one in the present application. It can be understood that, in the enlightenment of the technical essence of the present application, a person skilled in the art can further make another change on the first predetermined operation, provided that a function implemented and an effect achieved by the first predetermined operation are the same as or similar to those of the present application, and shall be covered within the protection scope of the claims of the present application.

Figure 4:
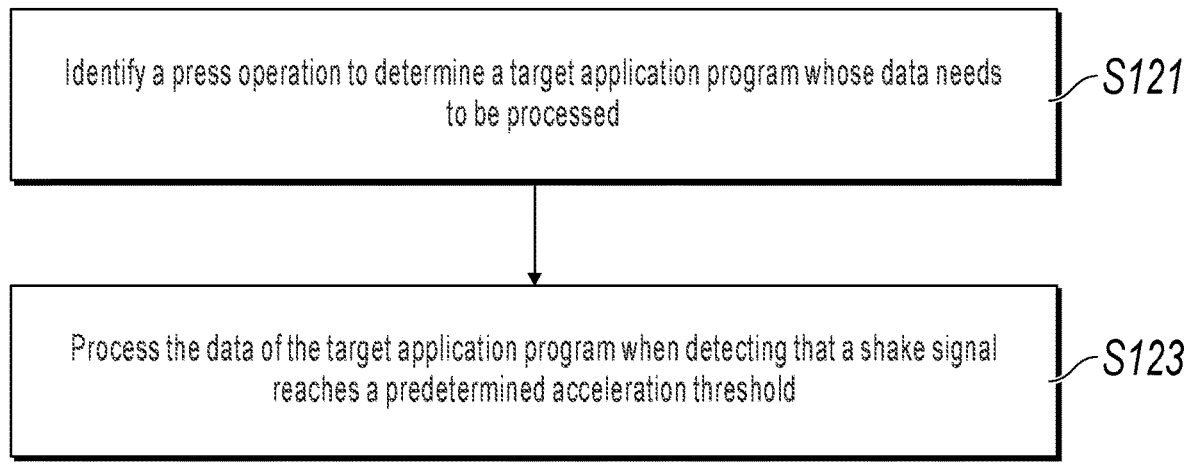
FIG. 4 is a flowchart illustrating an application program data processing method, according to an implementation of the present application.

Referring to FIG. 4, in an implementation, the second predetermined operation is a combination of a shake operation and a press operation, and processing data of a target application program can include the following steps:

Step S121: Identify a press operation to determine the target application program whose data needs to be processed.

Step S123: Process the data of the target application program when detecting that a shake signal reaches a predetermined acceleration threshold.

In the present implementation, the press operation can be an operation of pressing, by the user in the pending state, the target application program in a predetermined area in the interface of the touchscreen. A trigger signal generated based on the press operation can be an electrical signal that corresponds to a press and that is detected at a predetermined coordinate point in the interface of the touchscreen. In the present implementation, a target application program that needs to be cleaned can be determined by identifying the press operation.

In the present implementation, a trigger signal generated based on the shake operation can be an acceleration signal generated when an acceleration sensor reaches a specified threshold. The acceleration sensor is integrated into a mobile device, and the acceleration sensor can measure accelerations in three directions: X, Y, and Z. The X, Y, and Z directions are perpendicular to each other, and can form a three-dimensional space coordinate system. A value of the X direction can represent a horizontal movement of the device, a value of the Y direction can represent a vertical movement of the device, and a value of the Z direction can represent a vertical direction of the device in space. During use, the accelerations in the three directions are transmitted to an operating system, and the operating system combines the accelerations in the three directions into a final acceleration value. Further, the operating system can compare the final acceleration value with a specified acceleration value, and process the data of the target application program when determining that the shake signal reaches the predetermined acceleration threshold.

Figure 5:
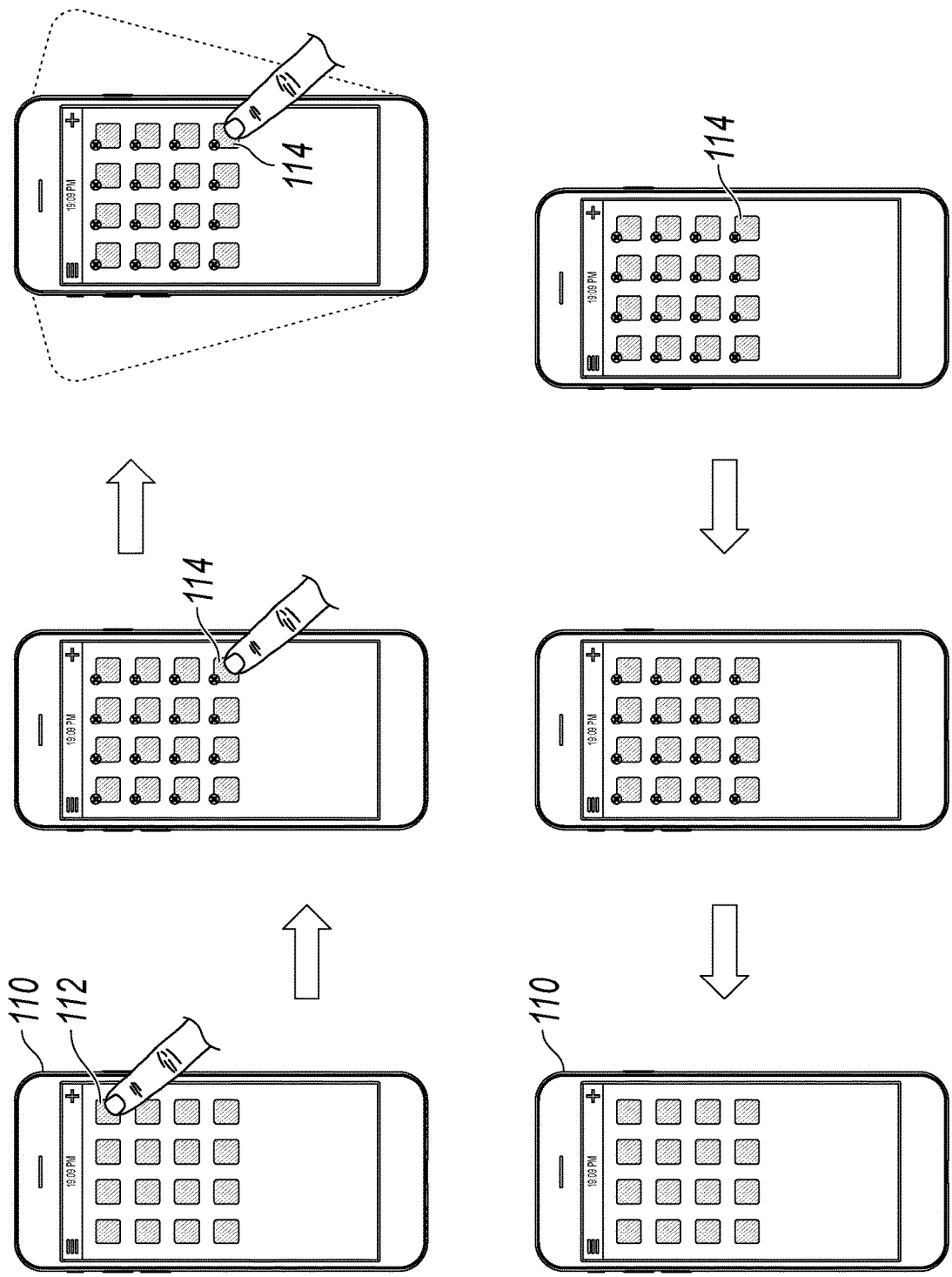
FIG. 5 is a workflow illustrating steps of an application program data processing method, according to an implementation of the present application.

Referring to FIG. 5, in an implementation, in an interface 110, a user can touch and hold an icon of an application program 112. A pending state of the application program is triggered when a device detects the touch and hold operation. In this case, the user can touch and hold a target application program 114 that needs to be cleaned, and shake the device at the same time. When an acceleration signal received by an acceleration sensor in the device reaches a predetermined acceleration threshold, the data of the target application program 114 is cleared. In the clearing process, an icon of the target application program 114 can be rotated 360 degrees. When the clearing succeeds, the icon of the target application program 114 is rotated to the initial location. In this case, it indicates that the data that corresponds to the target application program 114 has been cleared. When data of another application program does not need to be cleared, the user can tap a blank area, press a home key, etc., to exit the pending state, to return to an original state of the interface 110.

Based on the application program data processing method described in the previous implementations, the present application further provides an application program data processing device.

Figure 6:
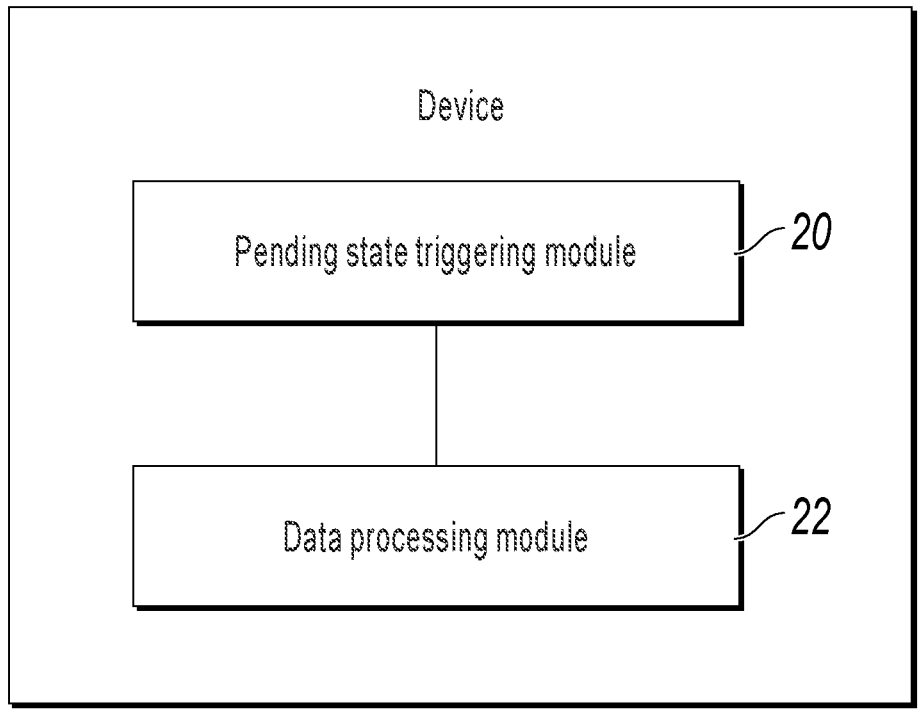
FIG. 6 is a schematic diagram illustrating an application program data processing device, according to an implementation of the present application.

Referring to FIG. 6, the application program data processing device can include a pending state triggering module 20 and a data processing module 22.

The pending state triggering module 20 can be configured to trigger a pending state of an application program when a first predetermined user operation in an interface is detected. The interface has an icon of at least one application program.

The data processing module 22 is configured to process data of a target application program in the pending state, when a second predetermined user operation on the target application program is detected.

Figure 7:
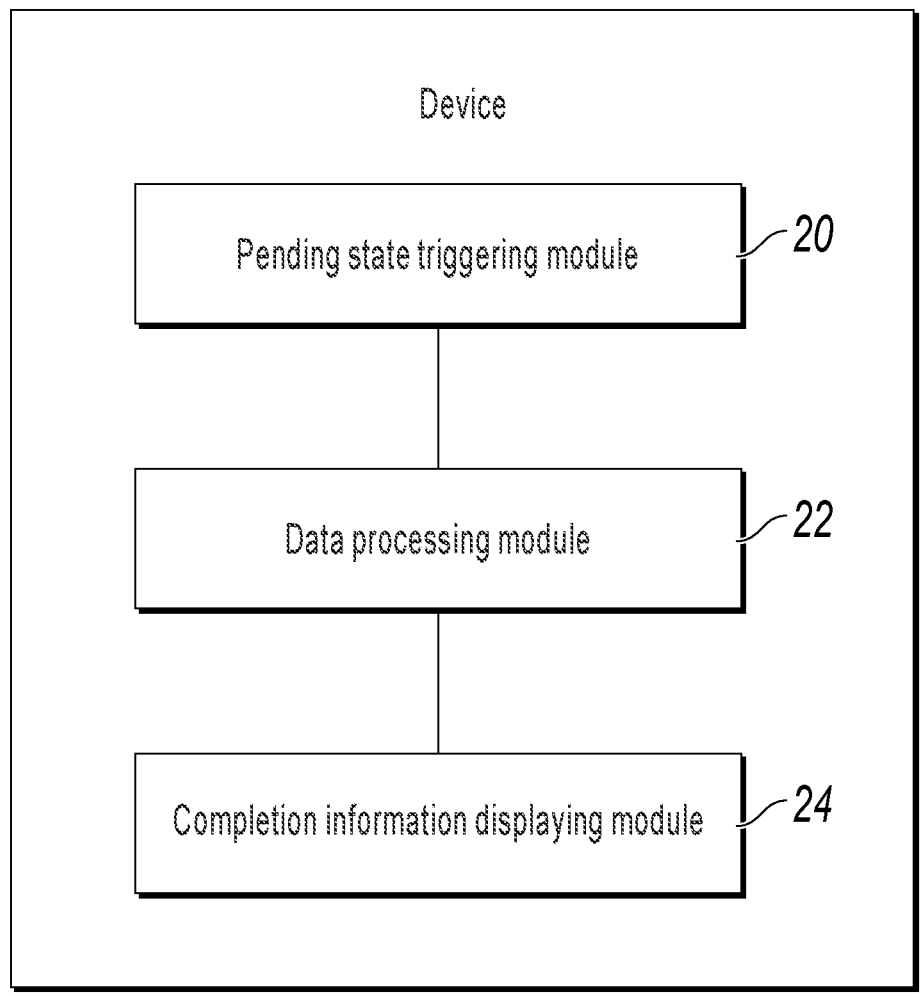
FIG. 7 is a schematic diagram illustrating an application program data processing device, according to an implementation of the present application.

Referring to FIG. 7, in another implementation of the application program data processing device, the device can further include the following.

The completion information displaying module 24 can be configured to display completion information after it is detected that data processing of the target application program is completed.

Figure 8:
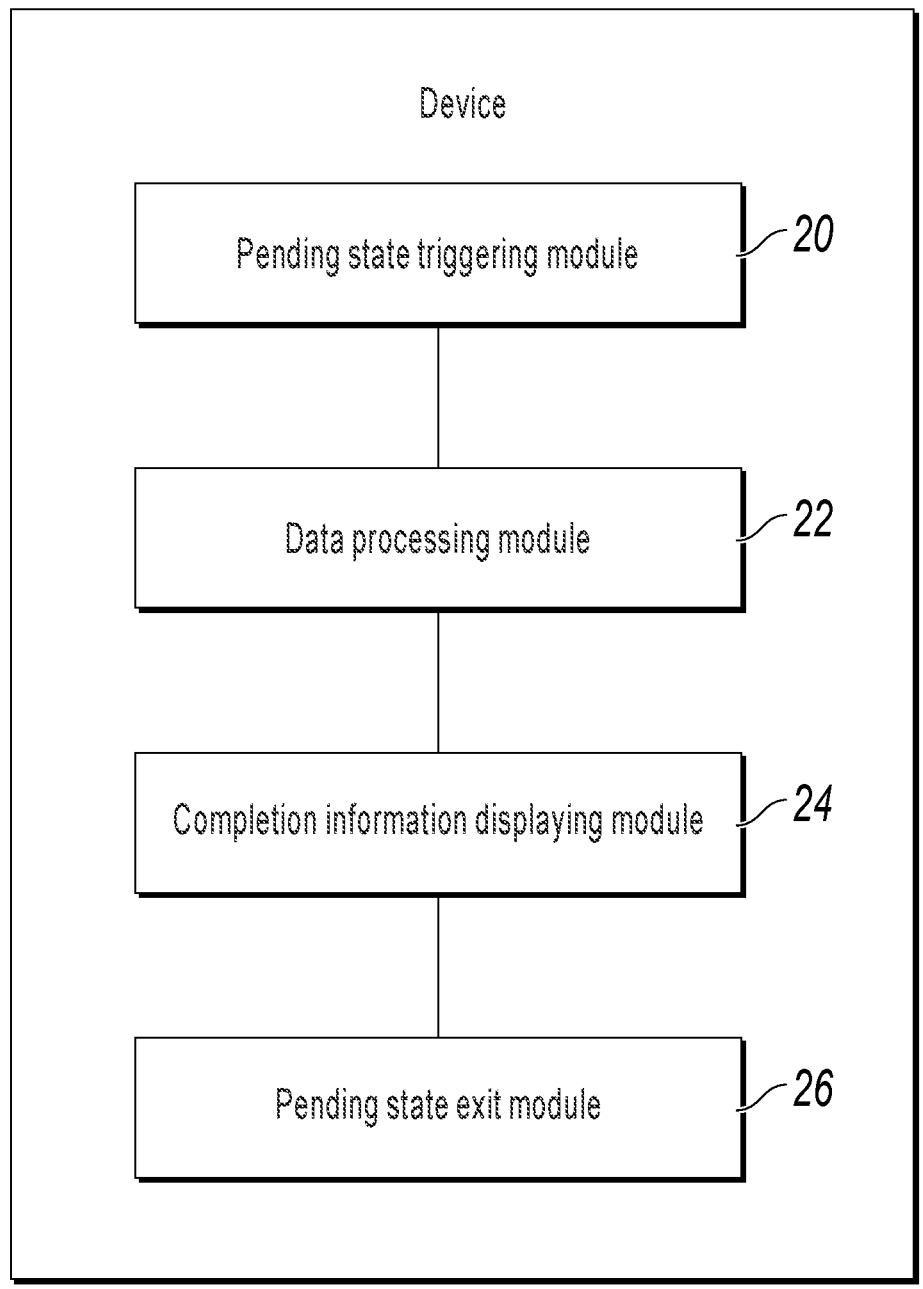
FIG. 8 is a schematic diagram illustrating an application program data processing device, according to an implementation of the present application.

Referring to FIG. 8, in another implementation of the application program data processing device, the device can further include the following.

The pending state exit module 26 can be configured to trigger the application program to exit the pending state when a third predetermined user operation in the interface is detected.

Figure 9:
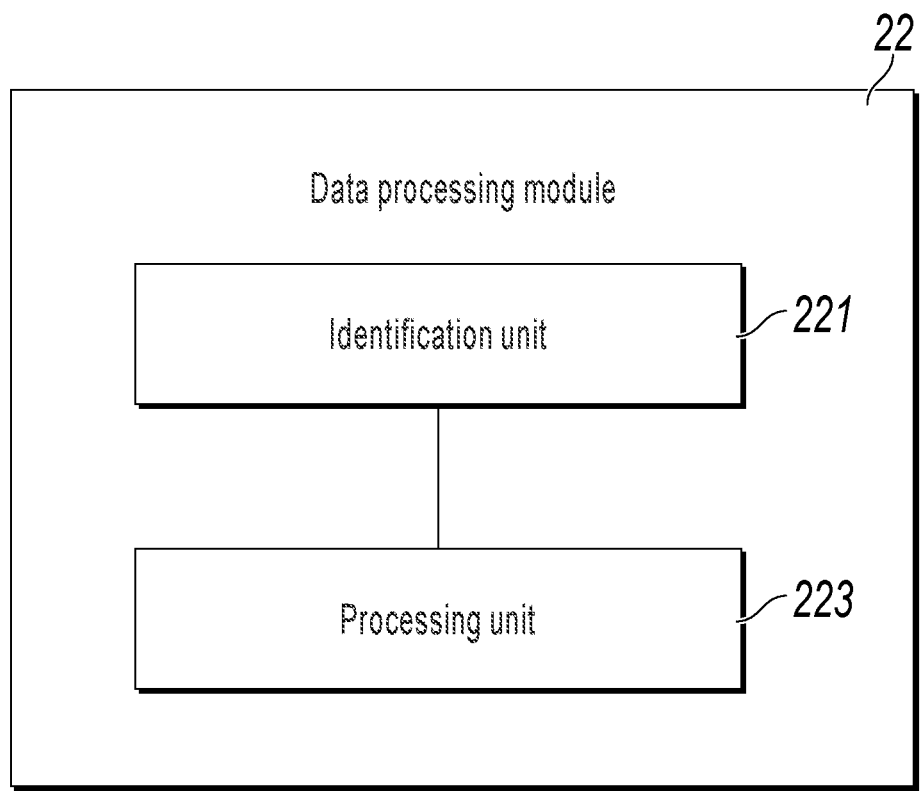
FIG. 9 is a schematic diagram illustrating a data processing module, according to an implementation of the present application.

Referring to FIG. 9, in another implementation of the application program data processing device, the second predetermined operation is a combination of a shake operation and a press operation, and the data processing module 22 can include an identification unit 221 and a processing unit 223.

The identification unit 221 can be configured to identify the press operation to determine the target application program whose data needs to be processed.

The processing unit 223 can be configured to process the data of the target application program when it is detected that a shake signal reaches a predetermined acceleration threshold.

The application program data processing device disclosed in the previous implementation corresponds to the implementation of the application program data processing method in the present application, and can implement the implementation of the application program data processing method in the present application and achieve a technical effect of the method implementation.

The above description in the implementations of the present application is merely application of some implementations of the present application, and an implementation slightly modified based on some standards and methods can also be used to implement the solutions in the implementations of the present application. Certainly, other noncreative changes in accordance with steps of the processing method in the implementations of the present application can still be used to implement the same application. Details are omitted here for simplicity.

Although the present application provides the method steps in the implementations or the flowchart, more or fewer operation steps can be included based on conventional or noncreative efforts. A sequence of the steps enumerated in the implementations is merely one of execution sequences of the steps, and does not represent a unique execution sequence. When the method is executed by a device or a client product in actual applications, the method can be executed based on the sequence of the method in the implementations or accompanying drawings, or can be executed in parallel (for example, a parallel processor or a multi-thread processing environment).

The devices or modules described in the above implementations can be implemented by a computer chip or an entity, or implemented by a product with a certain function. For ease of description, the previous device is described by dividing the functions into various modules. When the present application is implemented, the functions of all modules can be implemented in one or more pieces of software and/or hardware. Certainly, a module that implements a function can be implemented by using a combination of a plurality of submodules or subunits.

The method, device, or module described in the present application can be implemented by embedding a readable program in a controller. The controller is implemented based on needs. For example, the controller can use a form such as a microprocessor or a processor and a computer readable medium that stores computer readable program code (e.g., software or firmware) that can be executed by the (micro) processor, a logic gate, a switch, an application specific integrated circuit (ASIC), a programmable logic controller, and an embedded microcontroller. An example of the controller includes but is not limited to the following microcontrollers: ARC 625D, Atmel AT91SAM, Microchip PIC18F26K20, and Silicone Labs C8051F320. The memory and the controller may alternatively be implemented as a part of the control logic of the memory. A person skilled in the art also knows that, in addition to implementing the controller by using the computer readable program code, logic programming can be performed on method steps to allow the controller to implement the same function in forms of the logic gate, the switch, the ASIC, the programmable logic controller, and the embedded microcontroller. Therefore, the controller can be considered as a hardware component, and a device that is included in the controller and configured to implement various functions can also be considered as a structure in the hardware component. Or, the device configured to implement various functions can even be considered as both a software module implementing the method and a structure in the hardware component.

Some modules in the device in the present application can be described in the general context of an executable computer instruction executed by a computer, for example, a program module. Generally, the program module includes a routine, a program, an object, a component, a data structure, a type, etc. that executes a task or implements an abstract data type. The present application can also be practiced in distributed computing environments. In the distributed computing environments, tasks are performed by remote processing devices that are connected through a communications network. In a distributed computing environment, the program module can be located in both local and remote computer storage media including storage devices.

It can be seen from the description of the implementations that, a person skilled in the art can clearly understand that the present application can be implemented by using software in addition to necessary hardware. Based on such an understanding, the technical solutions of the present application essentially, or the part contributing to the existing technology can be implemented in a form of a software product, or can be implemented in a data migration implementation process. The computer software product can be stored in a storage medium, such as a ROM/RAM, a magnetic disk, or an optical disc, and includes several instructions to enable a computer device (which may be a personal computer, a mobile terminal device, a server, a network device, etc.) to execute the method in the implementations or some parts of the implementations of the present application.

The implementations in the present application are all described in a progressive method. For the same or similar parts in the implementations, reference can be made to these implementations, and each implementation focuses on a difference from other implementations. All or a part of the present application can be used in many general-purpose or dedicated computer system environments or configurations, for example, a personal computer, a server computer, a handheld device or a portable device, a tablet device, a mobile communications terminal, a multiprocessor system, a microprocessor-based system, a programmable electronic device, a network PC, a small computer, a mainframe computer, and a distributed computing environment including any of the above systems or devices.

In the present application document, a plurality of implementations of the present application are described, and a person skilled in the art can understand that the implementations in the present application can be combined with each other. In addition, a person skilled in the art knows that many modifications and variations of the present application can be made without departing from the spirit of the present application. It is intended that the claims include these modifications and variations without departing from the spirit of the present application.

Figure 10:
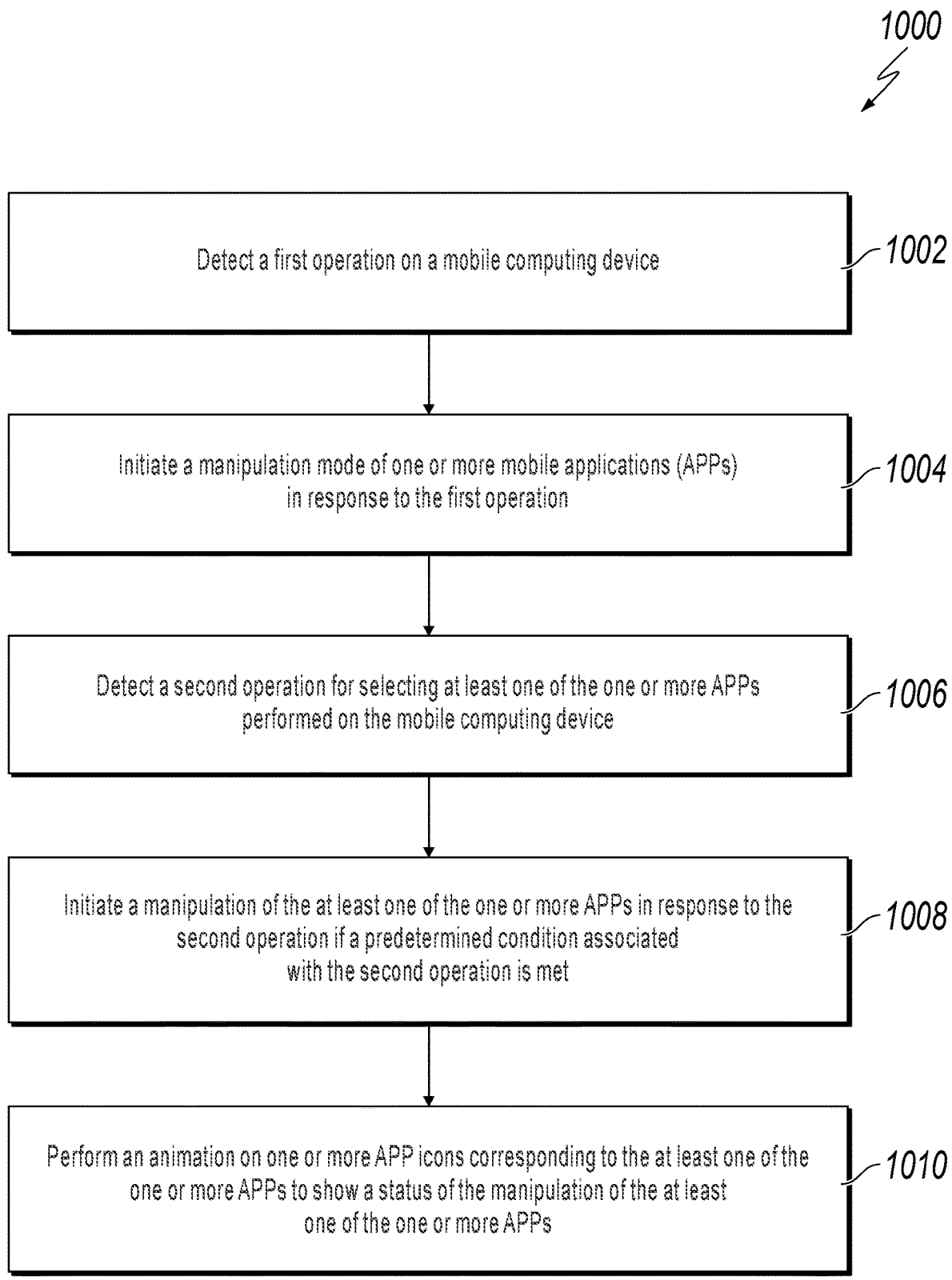
FIG. 10 is a flowchart illustrating an example of a computer-implemented method for managing mobile application data, according to an implementation of the present application.

FIG. 10 is a flowchart illustrating an example of a computer-implemented method 1000 for managing mobile application (APP) data, according to an implementation of the present disclosure. For clarity of presentation, the description that follows generally describes method 1000 in the context of the other figures in this description. However, it will be understood that method 1000 can be performed, for example, by any system, environment, software, and hardware, or a combination of systems, environments, software, and hardware, as appropriate. In some implementations, various steps of method 1000 can be run in parallel, in combination, in loops, or in any order.

At 1002, a first operation on a mobile computing device is detected. The first operation can be a touch-sensitive operation such as a press operation, a press-and-hold operation, a slide operation, or other gestures performed on the touchscreen of the mobile computing device. The first operation can also be an acceleration motion such as jiggling performed on the mobile computing device. The touch-sensitive operation can be performed by a user's hand, a resistive sensing device, a capacitive sensing device, an infrared sensing device, an electromagnetic induction device, an optical sensing device, a heat-sensing device, or other touch-sensitive objects. From 1002, method 1000 proceeds to 1004.

At 1004, a manipulation mode of one or more mobile APPs is initiated in response to the first operation. One or more animations such as jiggling or shaking of the APPs can be performed to show that the APPs are in the manipulation mode. In some implementations, the APPs can be moved, rearranged, renamed, edited, compressed, cleaned, or otherwise manipulated by a user of the mobile computing device while in the manipulation mode. From 1004, method 1000 proceeds to 1006.

At 1006, a second operation for selecting at least one of the one or more APPs performed on the mobile computing device is detected. For example, the second operation can be one or more press operations, a press-and-hold operations, a slide operation performed on a touchscreen of the mobile computing device, or an acceleration motion performed on the mobile computing device. In some implementations, a user can press-and-hold on one or more APP icons. While holding the APP icons, the user can also rock, shake, or rotate the mobile computing device to create an acceleration motion. The acceleration motion can be detected by an accelerometer, a gyroscope or other suitable motion sensors included in the mobile computing device. From 1006, method 1000 proceeds to 1008.

At 1008, a manipulation of the APP is initiated in response to the second operation if a predetermined condition associated with the second operation is met. In some implementations, the manipulation includes at least one of clearing a cache of the selected one or the one or more APPs, compressing data associated the APP, or defragmenting data associated with the APP. In some implementations, the predetermined condition associated with the second operation is at least one of a number of the one or more press operations, a length of the press-and-hold operation, a sliding trajectory of the slide operation, or an acceleration threshold of the acceleration motion. From 1008, method 1000 proceeds to 1010.

At 1010, an animation is performed on one or more APP icons corresponding to the at least one of the one or more APPs to show a status of the manipulation of the at least one of the one or more APPs. In some implementations, the animation is a rotation animation of the APP icon, where the APP icon rotates from an original position when the manipulation starts and returns back to the original position when the manipulation ends. In some implementations, the animation is a fading animation of the APP icon, where the APP icon starts to fade when the manipulation starts and returns back to normal when the manipulation ends. It is to be understood that other suitable animations that can show the status of the manipulation can also be used.

In some implementations, the manipulation mode automatically ends after the manipulation of the APP is completed. In some implementations, a third operation is detected on the mobile computing device, and the manipulation mode of the one or more mobile APPs ends in response to the third operation. In some implementations, the third operation can be one or more press operations, a press-and-hold operation, a slide operation performed on a touchscreen of the mobile computing device, or an acceleration motion performed on the mobile computing device.

In some implementations, the first touch-sensitive operation, the second touch-sensitive operation, or the third touch-sensitive operation is at least one of a press operation, a press-and-hold operation, a slide operation, or a jiggle operation performed on the touchscreen.

In some implementations, the first touch-sensitive operation, the second touch-sensitive operation, or the third touch-sensitive operation is performed by at least one of a hand, a resistive sensing device, a capacitive sensing device, an infrared sensing device, an electromagnetic induction device, an optical sensing device, or a heat-sensing device. After 1010, method 1000 stops.

Embodiments of the subject matter described in this specification can be implemented so as to realize particular advantages or technical effects. For example, implementations of the subject matter permit a mobile user to easily manipulate an APP by performing simple touch sensitive operation and hand gesture while intuitively monitoring the status of the manipulation. This allows APP data compression, defragmentation, cache clearing, or other manipulations to be more efficiently performed. User operations can be simplified and user experience can be improved.

The described methodology permits enhancement of data security of various mobile computing device. The mobile user can manipulate data of an APP by using touch and hand gestures without opening an APP. As such, the mobile user does not need to log in to a corresponding user account or perform a series of operations for data manipulation, thus the risk of handling mistake or information leakage can be reduced.

The described methodology can ensure the efficient usage of computer resources (for example, processing cycles, battery power, and memory usage). Through the efficient manipulation of APP data, the mobile computing device only needs to invoke operations corresponding to the detected touch sensitive operation and hand gesture. It is not required to open the APP and to invoke various functions not intended to be selected by a mobile user. As a result, for example, computing processing cycles and battery resources can be conserved.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer.

Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   detecting a first operation on a mobile computing device;
   initiating a manipulation mode of one or more mobile applications in response to the first operation, wherein the manipulation mode of the one or more mobile applications is a mode for processing cached data of the one or more mobile applications based on a user operation without starting the one or more mobile applications; and
   while the manipulation mode of the one or more mobile applications is initiated:
      detecting a second operation on the mobile computing device, wherein the second operation includes an acceleration motion performed on the mobile computing device and a press-and-hold operation performed on one or more application icons displayed concurrently on a touchscreen of the mobile computing device;
      determining that cached data of at least one of the one or more mobile applications is to be processed, the at least one of the one or more mobile applications corresponding to the one or more application icons;
      initiating a manipulation of the at least one of the one or more mobile applications in response to determining that the acceleration motion reaches an acceleration threshold, wherein the manipulation includes at least one of clearing a cache of the at least one of the one or more mobile applications, compressing data associated with the at least one of the one or more mobile applications, or defragmenting data associated with the at least one of the one or more mobile applications; and
      performing an animation on the one or more application icons corresponding to the at least one of the one or more mobile applications to show a status of the manipulation of the at least one of the one or more mobile applications.

2. The computer-implemented method of claim 1, further comprising automatically ending the manipulation mode after the manipulation of the at least one of the one or more mobile applications is completed.

3. The computer-implemented method of claim 1, further comprising:
   detecting a third operation on the touchscreen of the mobile computing device; and
   ending the manipulation mode of the at least one of the one or more mobile applications in response to the third operation.

4. The computer-implemented method of claim 3, wherein the first operation or the third operation is at least one of one or more press operations, a press-and-hold operation, a slide operation performed on the touchscreen of the mobile computing device, or an acceleration motion performed on the mobile computing device.

5. The computer-implemented method of claim 3, wherein the first operation, the second operation, or the third operation is a touch-sensitive operation performed on the touchscreen of the mobile computing device, and the touch-sensitive operation is performed by at least one of a hand, a resistive sensing device, a capacitive sensing device, an infrared sensing device, an electromagnetic induction device, an optical sensing device, or a heat sensing device.

6. The computer-implemented method of claim 1, wherein an animation on an application icon is a fading animation of the application icon occurs, where the application icon begins to fade when the manipulation starts and returns back to normal when the manipulation ends.

7. The computer-implemented method of claim 1, wherein clearing the cache of the at least one of the one or more mobile applications comprises:
   invoking at least two pre-stored deletion options based on the second operation, wherein the at least two pre-stored deletion options correspond to at least two cache categories, and the at least two cache categories include a first category of temporary cache file and a second category of favorite cache file; and
   clearing the cache in a corresponding cache category based on a deletion option selected by a user.

8. The computer-implemented method of claim 1, wherein performing the animation comprises moving an application icon based on a predetermined track.

9. The computer-implemented method of claim 1, wherein performing the animation comprises controlling an application icon to switch from a first display state to a second display state.

10. The computer-implemented method of claim 1, wherein performing the animation comprises rotating the application icon 180 degrees back and forth.

11. The computer-implemented method of claim 1, wherein the manipulation includes two or more of clearing the cache of the at least one of the one or more mobile applications, compressing the data associated with the at least one of the one or more mobile applications, or defragmenting the data associated with the at least one of the one or more mobile applications.

12. The computer-implemented method of claim 1, wherein the manipulation includes at least one of compressing the data associated with the at least one of the one or more mobile applications or defragmenting the data associated with the at least one of the one or more mobile applications.

13. The computer-implemented method of claim 1, wherein the first operation is detected when a user presses one or more function keys disposed on the mobile computing device.

14. A non-transitory, computer-readable medium storing one or more instructions executable by a computer system to perform operations comprising:
   detecting a first operation on a mobile computing device;
   initiating a manipulation mode of one or more mobile applications in response to the first operation, wherein the manipulation mode of the one or more mobile applications is a mode for processing cached data of the one or more mobile applications based on a user operation without starting the one or more mobile applications; and
   while the manipulation mode of the one or more mobile applications is initiated:
      detecting a second operation on the mobile computing device, wherein the second operation includes an acceleration motion performed on the mobile computing device and a press-and-hold operation performed on one or more application icons displayed concurrently on a touchscreen of the mobile computing device;
      determining that cached data of at least one of the one or more mobile applications is to be processed, the at least one of the one or more mobile applications corresponding to the one or more application icons;
      initiating a manipulation of the at least one of the one or more mobile applications in response to determining that the acceleration motion reaches an acceleration threshold, wherein the manipulation includes at least one of clearing a cache of the at least one of the one or more mobile applications, compressing data associated with the at least one of the one or more mobile applications, or defragmenting data associated with the at least one of the one or more mobile applications; and
      performing an animation on the one or more application icons corresponding to the at least one of the one or more mobile applications to show a status of the manipulation of the at least one of the one or more mobile applications.

15. The non-transitory, computer-readable medium of claim 14, further comprising automatically ending the manipulation mode after the manipulation of the at least one of the one or more mobile applications is completed.

16. The non-transitory, computer-readable medium of claim 14, further comprising:
   detecting a third operation on the touchscreen of the mobile computing device; and
   ending the manipulation mode of the at least one of the one or more mobile applications in response to the third operation.

17. The non-transitory, computer-readable medium of claim 16, wherein the first operation or the third operation is at least one of one or more press operations, a press-and-hold operation, a slide operation performed on the touchscreen of the mobile computing device, or an acceleration motion performed on the mobile computing device.

18. The non-transitory, computer-readable medium of claim 16, wherein the first operation, the second operation, or the third operation is a touch-sensitive operation performed on the touchscreen of the mobile computing device, and the touch-sensitive operation is performed by at least one of a hand, a resistive sensing device, a capacitive sensing device, an infrared sensing device, an electromagnetic induction device, an optical sensing device, or a heat sensing device.

19. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations comprising:
   detecting a first operation on a mobile computing device;
   initiating a manipulation mode of one or more mobile applications in response to the first operation, wherein the manipulation mode of the one or more mobile applications is a mode for processing cached data of the one or more mobile applications based on a user operation without starting the one or more mobile applications; and
   while the manipulation mode of the one or more mobile applications is initiated:
      detecting a second operation on the mobile computing device, wherein the second operation includes an acceleration motion performed on the mobile computing device and a press-and-hold operation performed on one or more application icons displayed concurrently on a touchscreen of the mobile computing device;
      determining that cached data of at least one of the one or more mobile applications is to be processed, the at least one of the one or more mobile applications corresponding to the one or more application icons;
      initiating a manipulation of the at least one of the one or more mobile applications in response to determining that the acceleration motion reaches an acceleration threshold, wherein the manipulation includes at least one of clearing a cache of the at least one of the one or more mobile applications, compressing data associated with the at least one of the one or more mobile applications, or defragmenting data associated with the at least one of the one or more mobile applications; and performing an animation on the one or more application icons corresponding to the at least one of the one or more mobile applications to show a status of the manipulation of the at least one of the one or more mobile applications.

20. The computer-implemented system of claim 19, further comprising automatically ending the manipulation mode after the manipulation of the at least one of the one or more mobile applications is completed.

\* \* \* \* \*